United States Patent [19]

Hata et al.

[11] Patent Number: 4,816,049
[45] Date of Patent: Mar. 28, 1989

[54] PROCESS OF SURFACE TREATING LASER GLASS

[75] Inventors: Chiemi Hata; Kouichi Hara; Tetsuro Izumitani, all of Tokyo, Japan

[73] Assignee: Hoya Corporation, Tokyo, Japan

[21] Appl. No.: 884,907

[22] Filed: Jul. 14, 1986

[30] Foreign Application Priority Data

| Jul. 12, 1985 | [JP] | Japan | 60-152310 |
| Jul. 12, 1985 | [JP] | Japan | 60-152312 |
| Aug. 8, 1985 | [JP] | Japan | 60-173198 |
| Aug. 8, 1985 | [JP] | Japan | 60-173199 |

[51] Int. Cl.$^4$ ............................................. C03C 15/02
[52] U.S. Cl. ........................................ 65/3.2; 65/3.11; 65/30.12; 65/31; 65/60.52; 65/28; 427/163; 427/165; 427/169
[58] Field of Search .............. 65/18.4, 30.12, 31, 65/33, 401, 32, 60.52, 60.53, 3.11, 3.2; 427/163, 165, 169

[56] References Cited

U.S. PATENT DOCUMENTS

| 4,338,375 | 7/1982 | Hashimoto et al. | 427/165 |
| 4,397,666 | 8/1983 | Mishima et al. | 65/18.3 |
| 4,417,910 | 11/1983 | Passaret | 65/18.4 |
| 4,419,115 | 12/1983 | Johnson, Jr. et al. | 65/3.2 |
| 4,434,191 | 2/1984 | Cook et al. | 427/165 |
| 4,443,239 | 4/1984 | Biswas et al. | 65/3.11 |
| 4,525,189 | 6/1985 | Ohmi et al. | 65/31 |
| 4,528,010 | 7/1985 | Edahiro et al. | 65/31 |
| 4,623,700 | 11/1986 | Traver et al. | 427/165 |

FOREIGN PATENT DOCUMENTS 56-114904 9/1981 Japan ................................. 65/901

Primary Examiner—Arthur Kellogg
Attorney, Agent, or Firm—Cushman, Darby & Cushman

[57] ABSTRACT

A process of surface-treating a laser glass is disclosed which comprises coating a specific sol solution obtained by hydrolysis and partial polycondensation of a mixture containing a metal alcoholate on the glass surface and heating the coated glass to form a glassy coating, wherein the glass surface may be treated, prior to the coating, with an alkali aqueous solution and with an aqueous solution of phosphoric acid in sequence, or the coating and the heating may repeated to form a double- or multilayer of the same or different kind of glassy coatings. The thus treated laser glass has increased thermal shock resistance and water resistance.

11 Claims, No Drawings

PROCESS OF SURFACE TREATING LASER GLASS

FIELD OF THE INVENTION

This invention relates to a process of surfacetreating a laser glass used in laser systems either for increasing thermal shock resistance as well as water resistance on the surface of the laser glass.

BACKGROUND OF THE INVENTION

A phosphate based glass which possesses a narrow spectral bandwidth is excellent in the laser oscillation characteristic, so that in its use as laser glass especially high repetitive and high output oscillation is strongly desired. However, in such cases, heat from a flash lamp used for the excitation creates a temperature distribution within the glass, causing thermal stress therein. The phosphate based glass, e.g., phosphate or silicophosphate glass, has a low bending strength as compared with silicate glass and it is easily broken due to the thermal stress so that it is not suitable for use in high power laser oscillation.

In order to minimize the thermal stress air cooling or water cooling is usually performed, but it is not so effective because the glass itself has low thermal conductivity. Further, since the phosphate based glass has insufficient resistance to water and moisture, when air cooling or water cooling is performed, staining or dimming often occurs on the surface, resulting in the deterioration of breaking strength and oscillation performance.

In general, the thermal shock resistance R is represented by the following equation:

$$R = (1-\mu)\kappa S/\alpha E$$

wherein E is a Young's modulus, $\mu$ is a Poisson ratio, $\alpha$ is a coefficient thermal of expansion, $\kappa$ is a thermal conductivity, and S is a rupture (breaking) strength.

Since the factors E, $\mu$, $\alpha$ and $\kappa$ are constants for a given substance, in order to improve the thermal shock resistance it is necessary to increase the breaking strength S by any means.

Heretofore, in order to increase the breaking strength of glass there has been carried out a process wherein a compressive stress layer is formed on the surface of the glass by ion exchange using molten salt. However, this process can be applied only to specifically formulated glass compositions and cannot be applied to other glass compositions such as a phosphate based laser glass composition.

A process for increasing the breaking strength of a phosphate laser glass is described in U.S. Pat. No. 4,547,402, wherein the surface of the glass is coated with a sol solution which is prepared by hydrolyzing a metal alcoholate dissolved in an organic solvent and partially polycondensing, and the coated layer is then heat-treated to form a glassy coating on the surface of the laser glass. According to this process, the glassy coating formed eliminates, to some extent, microcracks present on the surface of the laser glass so that the thermal shock resistance can be increased. However, the microcracks cannot be completely eliminated by this method, and moreover the glassy coating does not provide satisfactory water resistance and breaking strength because of insufficient strength of the glassy coating itself.

SUMMARY OF THE INVENTION

As a result of intensive studies to overcome the above difficulties, the present invention has been achieved by the following discovery.

First of all, it has been found that if the microcracks are completely removed from the surface of the phosphate based laser glass before coating thereon the above described sol solution, the breaking strength, and hence the thermal shock resistance of the laser glass can be remarkably increased, and the microcracks can be completely removed by a specific chemical polishing. In general, it is considered that the presence of microcracks on the surface of laser glass is the main cause of easy break of glass. Although microcracks are mostly formed in the processing step such as grinding, sand blast, etc., they cannot be completely removed even by precision polishing, and moreover, they are considered to increase all the more when left alone. Thus, the coating after complete removal of the microcracks can provide a remarkable effect.

Secondly, in spite of the fact that the glassy coating itself obtained using the above described sol solution has the defect that, because of large difference in thermal expansion between the coating and the laser glass, cracks tend to be formed even with slight increases in temperature and this necessitates the heat treatment at a temperature as low as 350° C., so that the resulting glassy coating is apt to peel off due to poor water resistance when water is used as coolant, it has now become possible to obviate such a deficience by using a sol solution have a specific composition or forming double- or multilayer of glassy coating on the surface of laser glass, realizing that the coating formed may be made entirely free from cracks with improved breaking strength and water resistance.

An object of this invention is to provide a process of surface treating a phosphate based laser glass, wherein the thermal shock resistance and the water resistance are enhanced by forming one or more layers of specified glassy coating on the surface of the laser glass with or without a specific chemical polishing prior to the formation of the glassy coating.

DETAILED DESCRIPTION OF THE INVENTION

Microcracks are present in the surface layer of glass processed by sand blast or grinding, and particularly in a phosphate based laser glass the presence of such microcracks is the main cause of degradation in the breaking strength. Furthermore, even after these microcracks have been completely removed from the surface of the laser glass, if the glass is left as it is, the surface of the glass reacts with moisture present in the environment to cause dimming, and acts as nuclei to promote the formation of microcracks. For this reason, a glassy coating is provided on the surface of the glass.

In this invention, these microcracks can be removed by a specific chemical polishing. That is, the phosphate based laser glass processed by sand blasting or bright polishing is leached with an alkali aqueous solution whereby a soft dim layer is formed on the surface, and then the dim layer is completely removed by etching with an aqueous solution of phosphoric acid. By repeating the two stage operation comprising leaching and etching the microcracks present in the surface layer are completely removed to give a smooth surface. In the case where surface accuracy as required a slab laser is necessary, the surface may be further polished.

The chemical polishing comprising leaching and etching is carried out preferably under the following conditions: alkali aqueous solution such as KOH or NaOH solution, concentration 5 to 40 wt % (more preferably 10 to 30 wt %), temperature 30 to 90° C. (more preferably 50° to 70° C.), time 5 minutes to 4 hours (more preferably 30 minutes to 1 hour) for leaching; and the aqueous solution of $H_3PO_4$, concentration 10 to 100 wt % (more preferably 70 to 90 wt %), temperature 30 to 100° C. (more preferably 80° to 100° C.), time 5 minutes to 5 hours (more preferably 30 minutes to 2 hours), for etching. The amount of the surface layer of glass to be removed in order for the layer containing microcracks and flaws to be completely excluded is preferably 50 to 500 μm (more preferably 50 to 200 μm) as expressed in terms of thickness.

Subsequently, the surface with or without further polishing, is coated by a sol solution which is obtained by hydrolyzing a mixture comprising an organic solvent and a metal alcoholate, and optionally an organometallic compound and/or silica fine powder, and then partially polycondensing. The thus obtained coating is heat-treated (preferably at a temperature of 300° to 500° C.) to form a glassy coating.

The metal alcoholates and organometallic compounds used in this invention are those represented by the general formulae $Me(OR)_n$ and $R'Me(OR)_{n-1}$, respectively, wherein R represents a lower alkyl group preferably having up to 10 carbon atoms (e.g., $CH_3$, $C_2H_5$, $C_3H_7$, $C_4H_9$, etc.), R' represents an organic group such as an alkyl group and an aromatic group (e.g., $CH_3$, $C_2H_5$, $C_3H_7$, $C_6H_5$, etc.), represents a metal element selected from the group consisting of Si, Al, Ti, and Zr, and n is the valence of the metal element.

Preferred examples of the metal alcoholate include $Si(OCH_3)_4$, $Si(OC_2H_5)_4$, $Al(OC_3H_7)_3$, $Al(O-i-C_3H_7)_3$, $Ti(OC_2H_5)_4$, $Ti(OC_3H_7)_4$, $Ti(O-i-C_3H_7)_4$, $Ti(OC_4H_9)_4$, $Zr(OC_2H_5)_4$, $Zr(O-i-C_3H_7)_4$ and $Zr(OC_4H_9)_4$.

Preferred examples of the organometallic compound include $CH_3Si(OC_2H_5)_3$, $C_2H_5Si(OC_2H_5)_3$, $C_2H_5Al(OC_2H_5)_2$, and $CH_3Si(OCH_3)_3$.

The silica fine powder used in this invention preferably has an average particle size of 5 to 100 nm, preferably 5 to 40 nm in diameter.

Examples of the organic solvent include alcohols such as methanol, ethanol, propanol, isopropanol, butanol, etc., and acetone, ether, acetylacetone, benzene, etc.

The hydrolysis and partial polycondensation can be effected merely by adding water and an acid (e.g., HCl, $HNO_3$, etc.) to the above described mixture, followed by stirring.

As the surface of the glass with the thus formed glassy coating can be wholly prevented from the generation of microcracks, a laser glass having an increased thermal shock resistance can be obtained. As shown in Examples 1 through 3, thermal shock resistance can be increased 5 to 10 times that of a conventionally processed laser glass by chemical polishing and the formation of the glassy coating, which permits the application of an excitation light 5 to 10 times much as is usually applied. Therefore, the laser output can be markedly increased.

Another embodiment of this invention is a glassy coating formed on a phosphate based laser glass, with or without the chemical polishing, by coating a sol solution which is prepared by hydrolyzing a mixture of a metal alcoholate and an organic solvent and optionally an organometallic compound and/or silica fine powder and partially polycondensing, and then heat-treating the coating.

It is preferred that the organometallic compound be contained in the mixture and the resulting coating be heated in an oxygen atmosphere and an inert gas atmosphere. Since the glassy coating contains an organic substance which is derived from the organometallic compound, in contrast to a coating composed of inorganic substances alone, the glassy coating exhibits only minimized shrinkage upon the heat-treatment, which is similar to the laser glass substrate, so that the coating can be subjected to heat treatment at an increased temperature without forming any cracks in the coating. The increased temperature in the heat-treatment results in improved adhesiveness between the glass substrate and the glassy coating.

The sol solution used in this embodiment can be prepared in the same manner as described above using the above described metal alcoholate, organometallic compound, organic solvent and silica fine powder. Preferred mixing ratio (by mole) of these components are given below:

Metal Alcoholate/Organometallic Compound/Silica Fine Powder/Organic Solvent/Water/Acid = 1/0-1/0-5/1-40/1-20/0.01-1 (more preferably 1/0.01-1/0-5/1-40/1-20/0.01-1).

The sol solution prepared is coated on the surface of a phosphate based laser glass by dip coating, and after drying, the heat-treatment is performed in the following manner.

It is important that the organic group R' of the organometallic compound $R'Me(OR)_{n-1}$ if included in the coating should not be burnt and remain as such as much as possible. For this purpose the coating is generally heated in a low temperature region of 250° to 400° C. for not less than 30 minutes, preferably 1 to 30 hours, in an atmosphere of oxygen (e.g., in air) in the first stage, whereby the alcoholate group —OR is completely burnt, increasing the degree of polymerization of the coating material. Next, in the second stage, the coating is further heated at a temperature of 350° to 500° C. for not less than 30 minutes, preferably 1 to 30 hours, in an atmosphere of inert gas (e.g., $N_2$, He, Ar, etc.) so as not to burn the organic group R' in the coating to form pin holes. However, the optimum temperature varies depending on the kind of the organic group R' in the organometallic compound. The resulting glassy coating consists of both organic and inorganic substances and provide an excellent adhesiveness to the laser glass substrate and in turn exhibits excellent water resistance as well as good thermal shock resistance.

As shown in Examples 4 through 9, the phosphate based laser glass surface-treated according to this embodiment has excellent water resistance and good breaking strength.

The water resistance and the breaking strength can be further improved by repeating the above coating step and heating step to form double layer or multilayer of the same or different kind of glassy coating. Further, in this embodiment (i.e., the formation of double- or multilayer of glassy coatings), the sol solution to be coated does not necessarily include the organometallic compound. In the case, since the resulting glassy coating does not contain an organic substance but an inorganic substance alone, the heat-treatment of the coating should be carefully carried out. That is, the coating is slowly heated in an atmosphere of oxygen to reach at a temperature region of 300° to 350° C., preferably 400° to 500° C., whereby the organic substance in the coating is completely burnt.

As shown in Examples 10 through 12, the phosphate based laser glass having the double- or multilayer of glassy coating composed of inorganic substance alone and/or glass coating composed of both inorganic and organic substances has markedly improved water resistance and breaking strength as compared with those having a single-layered glassy coating.

This invention will be explained with reference to Examples below, but it should be understood that this invention is not limited thereto.

EXAMPLE 1

A phosphate laser glass, 5φ(diameter)×40 mm, processed by sand blast was immersed first in a 30 wt % aqueous solution of KOH at 55° C. for 30 minutes and then in an 80 wt % aqueous solution of $H_3PO_4$ at 90° C. for 10 minutes. By repeating these steps 5 times the chemical polishing was complete, in which case the amount of the glass etched was about 350 μm in terms of diameter reduction. The laser glass was cleansed and immediately thereafter coated with a sol solution obtained by hydrolyzing an ethanol solution of tetraethoxysilane and methyltriethoxysilane and partially polycondensing. The coated glass was dried at 60° C. and then at 120° C., and thereafter the temperature was raised slowly up to 350° C., and held at that temperature for 10 hours in an atmosphere of oxygen. Next, the temperature was further raised slowly up to 430° C. in an atmosphere of nitrogen and held at that temperature for 10 hours, whereby a glassy coating containing organic group —$CH_3$ was formed. The bending strength of the thus treated laser glass was 5,000 kg/cm$^2$, indicating that it was about 6.3 times higher than the strength (800 kg/cm$^2$) of a laser glass merely subjected to sand blast. Accordingly, the thermal shock resistance also increased about 6.3 times.

EXAMPLE 2

A phosphate laser glass of slab type, 3×10×40 mm, processed by sand blast was immersed first in a 28 wt % aqueous solution of NaOH at 60° C. for 1 hour and then in a 90 wt % aqueous solution of $H_3PO_4$ at 95° C. for 15 minutes. These steps were repeated 3 times to complete chemical polishing. After the glass was further processed by precision polishing, a sol solution containing silica fine particles was coated thereon. The sol solution was obtained by hydrolyzing an ethanol solution of tetraethoxysilane and colloidal silica dispersed in ethanol and partially polycondensing. The coated laser glass was dried at 120° C., and then the temperature was raised slowly to 400° C. and held at that temperature for 15 hours in an atmosphere of oxygen, to thereby form a glassy coating containing silica fine particles.

The bending strength of the above treated laser glass was 6,500 kg/cm$^2$, indicating that it was about 7.2 times higher than the strength (900 kg/cm$^2$) of a sand blast processed but untreated laser glass.

EXAMPLE 3

A silicophosphate laser glass of slab type, 3×10×40 mm, processed by bright polishing was immersed first in a 25 wt % aqueous solution of KOH at 60° C. for 30 minutes and then in a 90 wt % aqueous solution of $H_3PO_4$ at 85° C. for 15 minutes, and by repeating these steps 4 times the chemical polishing was complete. After the glass was further processed by bright polishing to increase the surface accuracy, a sol solution containing tetraethoxysilane was coated thereon. The sol solution was obtained by hydrolyzing an ethanol solution of tetraethoxysilane and partially polycondensing. The coated layer glass was dried at 80° C. and then the temperature was raised slowly to 410° C., and held at that temperature for 20 hours in an atmosphere of oxygen, whereby a $SiO_2$ glassy coating was formed.

The bending strength of the above treated laser glass was 6,800 kg/cm$^2$, indicating that it was about 5.7 times, higher than the strength (1,200 kg/cm$^2$) of a bright polished but untreated laser glass.

EXAMPLE 4

After 0.2 mole of methyltriethoxysilane, 1.0 mole of tetraethoxysilane, and 4 moles of ethanol were mixed and stirred, 5 moles of acidic water containing HCl (0.03 mole) was added to the resulting mixture and thoroughly mixed and stirred to effect hydrolysis and partial polycondensation. A bright-polished phosphate laser glass, 5φ×40 mm, was immersed in the thus prepared sol solution, and pulled up at a rate of 6 cm/min. from the solution. After drying at room temperature it was heated slowly to 330° C. and held at that temperature for 12 hours in an atmosphere of oxygen, and further it was heated slowly to 440° C. and held at that temperature for 15 hours in an atmosphere of nitrogen, whereby a glassy coating containing organic group —$CH_3$ was formed.

The bending strength of the phosphate laser glass having on the surface a —$CH_3$-containing glassy coating was 2,700 kg/cm$^2$, indicating that it was about 3.0 times higher than the bending strength (900 kg/cm$^2$) of an uncoated laser glass. Also, even when the coated laser glass was immersed in water at 50° C. for 10 days, neither peeling off nor degradation of the coating was observed.

EXAMPLE 5

After 0.25 mole of phenyltriethoxysilane, 1 mole of tetraethoxysilane, and 6 moles of ethanol were mixed and stirred, 4 moles of acidic water containing nitric acid (0.01 mole) was added to the resulting mixture and thoroughly mixed and stirred to effect hydrolysis and partial polycondensation. In this sol solution was immersed a phosphate laser glass of slab type, 3×10×40 mm, whose 4 side faces were bright-polished, and pulled up at a rate of 4 cm/min. The thus coated laser glass was dried at 120° C., and then the temperature was raised slowly to 350° C., and held there for 8 hours in an atmosphere of oxygen, and further the temperature was raised slowly to 450° C. in a atmosphere of nitrogen, and held there for 10 hours, whereby a glassy coating containing —$C_6H_5$ was formed. The bending strength of the thus formed phosphate laser glass was 3,100 kg/cm$^2$, indicating that it was 3.1 times higher than the bending strength (1,000 kg/cm$^2$) of the uncoated laser glass. Also, even when the coated laser glass was immersed in water at 50° C. for 20 days, neither peeling off nor degradation of the coating was observed.

EXAMPLE 6

After 0.3 mole of methyltrimethoxysilane, 1.2 moles of tetraethoxysilane, and 10 moles of isopropanol were mixed and stirred, the resulting solution was hydrolyzed at 50° C. with the addition of 8 moles of water acidified with hydrochloric acid (0.01 mole). After adding thereto further 0.5 mole of tetraisopropoxyzirconium diluted with isopropanol, the resulting mixture was stirred for 1 hour at 50° C., and then allowed to stand for about one day at room temperature to cause hydrolysis and partial polycondensation, whereby a sol solution was obtained. A silicophosphate laser glass, $5\phi \times 40$ mm, processed by sand blast was immersed in this sol solution, and pulled up at a rate of 6 cm/min. The coated laser glass was dried at room temperature, and then the temperature was slowly increased to 350° C. and held there for 10 hours in an atmosphere of oxygen and further increased to 470° C. in an atmosphere of nitrogen and held at that temperature for 10 hours, whereby a glassy coating containing —$CH_3$ was formed.

The bending strength of the thus treated silicophosphate laser glass was 2,500 kg/cm$^2$, indicating that it was about 4.2 times higher than the strength (600 kg/cm$^2$) of the uncoated laser glass.

EXAMPLE 7

After 1.0 mole of tetraethoxysilane, 1 mole of silica fine powder, and 10 moles of ethanol were mixed and stirred, a mixture of 2.5 moles of water, 10 moles of ethanol and 0.01 mole of hydrochloric acid were added to the resulting mixture and thoroughly mixed and stirred to effect hydrolysis and partial polycondensation. A bright-polished phosphate laser glass, $5\phi \times 40$ mm, was immersed in the thus prepared sol solution and then pulled up from the sol solution. After drying at 60° C. it was heated at 410° C. for 20 hours in an atmosphere of oxygen, whereby a glassy coating containing silica fine powder was formed.

The bending strength of the phosphate laser glass was 2,450 kg/cm$^2$, indicating that it was about 4 times higher than the bending strength (600 kg/cm$^2$) of an uncoated laser glass. Also, even when the coated laser glass was immersed in water at 50° C. for 10 days, no degradation of the coating was observed with a microscope.

EXAMPLE 8

After 0.05 mole of phenyltriethoxysilane, 1 mole of tetraethoxysilane, 1 mole of silica fine powder, 0.05 mole of methyltriethoxysilane and 10 moles of ethanol were mixed and stirred, a mixture of 2.5 moles of water, 0.01 mole of nitric acid and 15 moles of ethanol was added to the resulting mixture and thoroughly mixed and stirred to effect hydrolysis and partial polycondensation. A bright-polished phosphate laser glass, $5\phi \times 40$ mm, was immersed in the thus prepared sol solution and then pulled up. The thus coated laser glass was dried at 60° C., and then heated at 350° C. for 20 hours in an atmosphere of oxygen, and further heated at 430° C. for 20 hours in a atmosphere of nitrogen, whereby a glassy coating containing —$C_6H_5$, —$CH_3$ and silica fine powder was formed.

The bending strength of the thus formed phosphate laser glass was 2,500 kg/cm$^2$, indicating that it was about 4 times higher than the bending strength (600 kg/cm$^2$) of the uncoated laser glass. Also, even when the coated laser glass was immersed in water at 50° C. for 10 days, no degradation of the coating was observed with a micronscope.

EXAMPLE 9

After 1 mole of tetraethoxysilane, 1 mole of silica fine powder, 0.01 mole of aluminum isopropoxide, 0.01 mole of zirconium isopropoxide, 10 moles of ethanol, 2.5 moles of water and 0.01 mole of hydrochloric acid were mixed to carry out partial hydrolysis, 0.01 mole of titanium tetrabutoxide and 15 moles of ethanol were further added to the resulting mixture and stirred. A bright-polished phosphate laser glass, $5\phi \times 40$ mm, was immersed in the thus prepared sol solution, and then pulled up. The coated laser glass was dried at 60° C., and then heated at 410° C. for 20 hours in an atmosphere of oxygen, whereby a glassy coating containing silica fine powder was formed.

The bending strength of the thus treated phosphate laser glass was 2,600 kg/cm$^2$, indicating that it was about 4 times higher than the bending strength (600 kg/cm$^2$) of the uncoated laser glass. Also, even when the coated laser glass was immersed in water at 50° C. for 15 days, no degradation of the coating was observed with a microscope.

EXAMPLE 10

A bright-polished phosphate laser glass, $5\phi \times 40$ mm, was immersed in a coating solution which was obtained by partial hydrolysis of a mixture comprising 1 mole of tetraethoxysilane, 2.5 moles of water, 7 moles of ethanol, and 0.01 mole of hydrochloric acid, and pulled up. The coated laser glass was dried at 60° C., and then heated at 410° C. for 20 hours in oxygen to form a glassy coating. Further, 1 mole of tetraethoxysilane, 1 mole of silica fine powder, 2.5 moles of water, 20 moles of ethanol, and 0.01 mole of hydrochloric acid were mixed and partially hydrolyzed to give a coating solution, in which the above obtained single layer-coated phosphate laser glass was immersed to carry out dip coating. The thus coated laser glass was dried at 60° C., and heated at 410° C. for 20 hours in oxygen, whereby a second glassy coating was formed. As the result of observation with a microscope it was found that when the double layer-coated phosphate lasers glass was placed in water at 50° C., spots did not appear on the surface of the coating for one month. In contrast, in the above described single layer-coated phosphate laser glass the spots appeared only after 24 hours. It is clearly seen that the water resistance is markedly improved by the formation of double-layer coatings. Further, the bending strength of the double layer-coated phosphate laser glass was 3,100 kg/cm$^2$, which was about 5.2 times the strength (600 kg/cm$^2$) of the uncoated phosphate glass, and even as compared with the bending strength 2,450 kg/cm$^2$ of the single layer-coated phosphate glass it is apparent that the double-layer coating enhances the bending strength.

EXAMPLE 11

The same coating as the first layer of the coating in Example 10 was applied on the surface of a phosphate glass, $5\phi \times 40$ mm, and subjected to heat treatment. Then, a coating solution which was obtained by the partial hydrolysis of a mixture comprising 1 mole of tetraethoxysilane, 1 mole of silica fine powder, 0.01 mole of phenyltriethoxysilane, 2.5 moles of water, 20 moles of ethanol, and 0.01 mole of hydrochloric acid was applied to the above obtained single layer-coated phosphate glass by dip coating. The coated glass was dried at 60° C., and then heated at 350° C. for 20 hours in oxygen, and further at 430° C. for 20 hours in nitrogen, whereby a double layer-glassy coating was formed. As the result of observation with microscope it was found that when the double layer-coated phosphate glass was placed in water at 50° C. spots did not appear on the surface of the coating for one month. Further, the bending strength of the double layer-coated phosphate glass was 3,200 kg/cm$^2$. It is clearly seen that the double-layer coating enhances the water resistance and the bending strength.

EXAMPLE 12

The same coating as the first layer of the coating in Example 10 was applied on the surface of a phosphate glass, 5$\phi$×40 mm, and subjected to heat treatment. Then, a coating solution which was obtained by adding a mixture of 2.5 moles of water, 10 moles of ethanol, and 0.01 mole of hydrochloric acid to a mixture of 1 mole of tetraethoxysilane, 0.01 mole of aluminum isopropoxide, 0.01 mole of zirconium tetraethylate, and 1 mole of silica fine powder to carry out partial hydrolysis, further adding to the resulting solution a mixture of 0.01 mole of titanium tetrabutoxide, 15 moles of ethanol with thorough stirring, the coating solution was applied on the above obtained single layer-coated phosphate glass by dip coating. The coated glass was dried at 60° C., and heated at 410° C. for 20 hours in oxygen. On this double layer-coated glass was further applied the above described first layer coating, and by heat treatment a triple-layer glassy coating was formed. By an observation with microscope it was found that when the triple layer-coated phosphate glass was placed in water at 50° C., spots did not appear on the surface of the coating for 1.5 months. Further, the bending strength of the triple layer-coated phosphate glass was 3,500 kg/cm$^2$. It is apparent that the triple-layer coating enhances the water resistance and the bending strength.

While the invention has been described in detail and with reference to specific embodiments thereof, it will be apparent to one skilled in the art that various changes and modifications can be made therein without departing from the spirit and scope thereof.

What is claimed is:

1. A process of surface-treating a phosphate based laser glass for increasing water resistance and thermal shock resistance thereof, which comprises:
   leaching the surface of the laser glass with an alkali aqueous solution;
   etching the surface of the laser glass with an aq aqueous solution of phosphoric acid so as to remove 50 to 500 um thickness;
   coating the surface of the laser glass with a sol solution which is obtained by hydrolyzing and partially polycondensing a mixture comprising an organic solvent and a metal alcoholate represented by formula Me(OR)$_n$ wherein R represents a lower alkyl group, Me represents a metal element selected from the group consisting of Si, Al, Ti, and Zr, and n is the valence of the element one or more components selected from the group consisting of silica fine powder and an organometallic compound represented by formula R'Me(OR)$_{n-1}$ wherein R' represents an organic group, with the addition of water acidified with an acid the mixing ratio by mol of the sol solution being metal alcoholate/organometallic compound/organic solvent/water/acid=1/0.01-1/1-40/1-20/0.01-1; and
   heating the coated glass to form a glass coating on the surface of the laser glass.

2. A process as in claim 1, wherein the leaching is carried out using an aqueous solution of KOH or NaOH having a concentration of 5 to 40 wt % at 30° to 90° C. for 5 minutes to 4 hours, and the etching is carried out using an aqueous solution of H$_3$PO$_4$ having a concentration of 10 to 100 wt % at 30° to 100° C. for 5 minutes to 5 hours.

3. A process as in claim 1, wherein the glassy coating is composed of an organic substance and an inorganic substance.

4. A process as in claim 3, wherein the heating is carried out in two stages that the coated glass is heated at a temperature of 250° to 400° C. for not less than 30 minutes in an atmosphere of oxygen in the first stage and further heated at a temperature of 350° to 500° C. for not less than 30 minutes in an atmosphere of inert gas in the second stage.

5. A process as in claim 1, wherein R is a methyl group, an ethyl group, a propyl group or a butyl group.

6. A process as in claim 1, wherein R is selected from the group consisting of a methyl group, an ethyl group, a propyl group or a butyl group and R' is a methyl group, an ethyl group, a propyl group and a phenyl group.

7. A process as in claim 1, wherein the mixing ratio by mole of the sol solution is:
   metal alcoholate/organic solvent/water/acid=1/1-40/1-20/0.01-1.

8. A process as in claim 7, wherein the sol solution further contains up to 5 moles of silica fine powder, per mole of the metal alcoholate.

9. A process as in claim 1, wherein the sol solution further contains up to 5 moles of silica fine powder, per mole of the metal alcoholate.

10. A process as in claim 1, wherein the coating and the heating are repeated to form a glassy coating in the form of double- or multilayer on the surface of the laser glass.

11. A process as in claim 1, wherein the leaching and the etching are repeated.

* * * * *